UNITED STATES PATENT OFFICE.

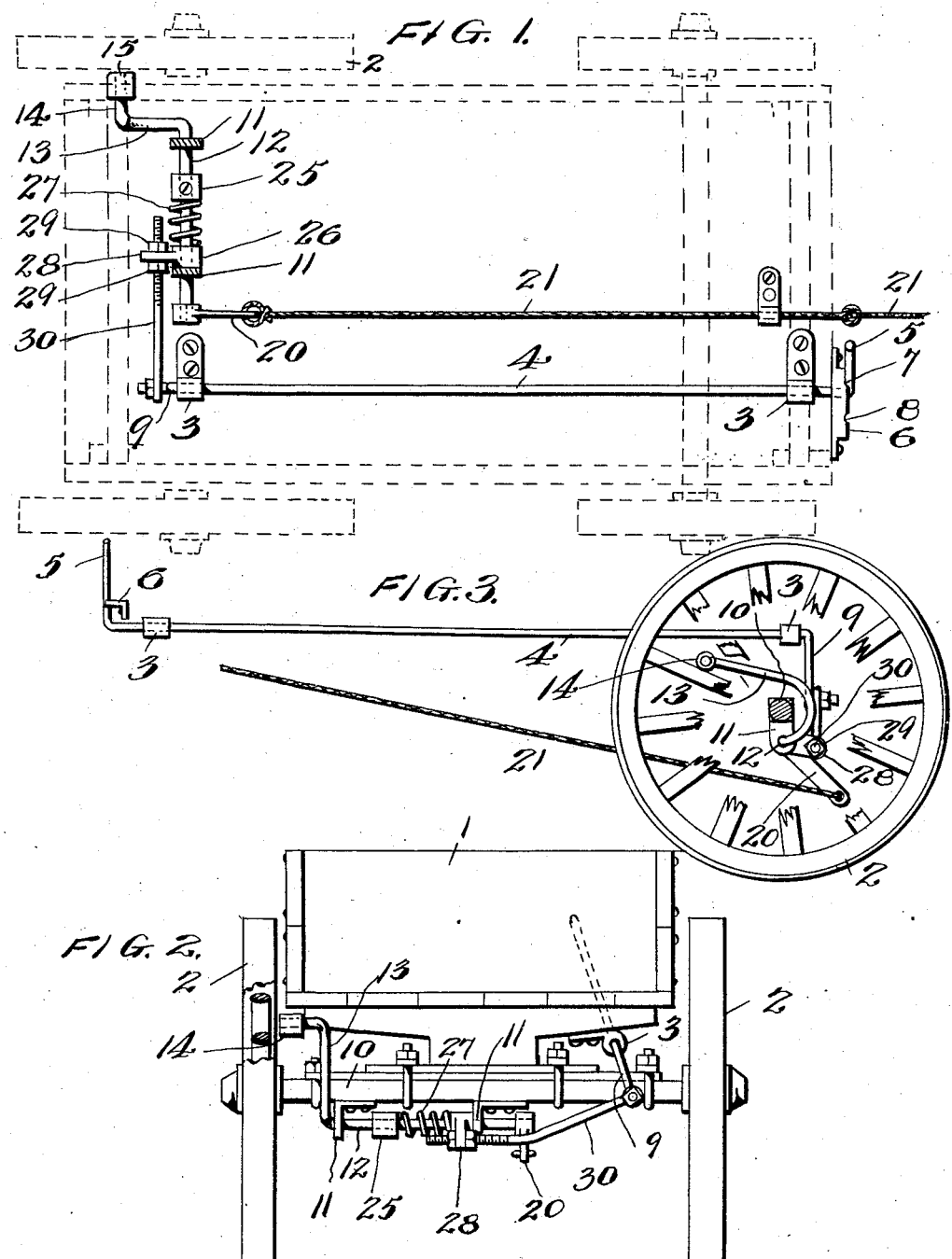

DANIEL W. ARAVE AND CHARLES W. WRIGHT, OF OGDEN, UTAH.

HORSE-STOPPING DEVICE.

1,049,639. Specification of Letters Patent. Patented Jan. 7, 1913.

Application filed March 22, 1912. Serial No. 685,609.

*To all whom it may concern:*

Be it known that we, DANIEL W. ARAVE and CHARLES W. WRIGHT, citizens of the United States, residing at Ogden, Utah, have invented certain new and useful Improvements in Horse-Stopping Devices, of which the following is a specification.

Our invention relates to mechanism which is attached to a vehicle and which may be attached to the horse or horses and placed in such a condition, when the vehicle is stationary, that if the horses start the mechanism will automatically check them, usually by pulling on the bits.

More particularly, our invention provides an improved and simplified mechanism of this character, and one which is capable of attachment and adjustment to vehicles of greatly differing types and dimensions.

Our invention further consists in the particular combinations and arrangements of parts disclosed, as set forth in the claims.

The accompanying drawing shows an exemplifying form in which the invention is embodied, but it is to be understood that it is capable of embodiment in other forms.

Figure 1 is a transparent plan of a vehicle embodying the invention, the parts constituting the invention being shown in solid lines. Fig. 2 is a rear end elevation, and Fig. 3 is a side view showing one of the rear wheels with the crank in operative position.

Reference character 1 designates a wagon-body having rear wheels 2. On the underside of the body are secured bearings 3 for the longitudinal shaft 4. At its front end, usually just in front of the front part of the wagon-body, the operating shaft 4 carries an upturned operating lever 5. The lever engages a segment or sector 6 which may be provided with notches 7, 8, to hold the lever in active and inactive position. At its rear end, shaft 4 carries a crank arm 9.

Attached to the rear axle 10 are suitable bearings 11 and in these is mounted the transverse crank shaft 12. At its outward end this shaft carries the curved crank 13. The outer end of this crank is bent outwardly to provide a member or pin 14 parallel with shaft 12, and on the end of this is mounted a cushioning device 15 of rubber or other suitable material to engage the spokes of the adjacent rear wheel 2. At the other end, crank shaft 12 carries an arm 20, to the end of which is connected a link or cord 21 which may be permanently connected to the bit or bits of the horse or horses attached to the wagon, or else this cord or link may be connected when the vehicle is stopped and it is desired to prevent the horse from moving. A block 25 is adjustably secured to the crank shaft 12. A slidable block 26 is also freely mounted on the shaft and a spring 27 is placed between the two blocks. Movable block 26 has an ear 28, and to this is adjustably connected by means of nuts 29, one end of link 30. The other end of the link is connected to the free end of crank arm 9.

Ordinarily, the operating lever 5 is in the position shown in Fig. 1 and crank end 15 is free from the wheel, but when the vehicle is stopped in order to prevent the horse from movement, the link or cord 21 is connected to the bits and lever 5 is moved over so that it engages notch 8. This movement of the lever through shaft 4 and arm 9 causes link 30 to push the movable block 26 toward the wheel. Spring 27 acting on fixed block 25 thereupon urges the crank shaft 12, crank 13 and crank end 15 toward the wheel. If crank end 15 happens to encounter a spoke in this movement, it will not actually enter the wheel but spring 27 will be compressed and retained in compression with crank end 15 against the spoke. In this case, if the horses start to pull the wagon forward, the wheel will move slightly until the spoke becomes disengaged from the end 15 of the crank and the crank end will then immediately spring into position in front of the next following spoke by the impulse of spring 27. If the animals move farther forward, the rotation of the wheel will now carry the crank end and crank around, and this motion imparted to the crank shaft 12 will move the free end of arm 20 downward and to the rear, thus causing a pull on the cord or link 21 and checking up the horses through their bits or bridles. The curved construction of the crank 13 as shown, permits the crank to have a large arc of motion about the rear axle that a long and strong pull upon the horses' bits may be given. At the same time, if the horses continue to pull forward, breakage of the bridles or other parts of the harness is prevented by the crank arm finally encountering the axle, and the horses will then simply be held with their heads pulled back and without the likelihood of actually breaking the harness by further pulling. The crank arm may be made strong enough to lock the rear wheel against further motion. To free the animals, it is only necessary to throw the lever back to notch 7, whereupon the crank end 15 is withdrawn from the wheel and the pull on cord 21 is relaxed.

What we claim is:

1. In mechanism of the class described, the combination of a vehicle-body and wheel, bearings near the rear end of the vehicle, a crank shaft mounted in said bearings for rotation and endwise movement, a fixed block on said crank shaft, a movable block on said shaft, a spring between the blocks, a longitudinal operating shaft secured in bearings on the vehicle, an operating lever at the front end thereof, a locking segment for the lever, a crank arm at the rear end of said shaft, a link connecting said crank arm and the movable block on said crank shaft, an arm on said crank shaft and a connection between said arm and the draft animal attached to the vehicle.

2. In mechanism of the class described, the combination of a vehicle-body and wheel, bearings near the rear end of the vehicle, a crank shaft mounted in said bearings for rotation and endwise movement, a fixed block on said crank shaft, a movable block on said shaft, a spring between the blocks, a longitudinal operating shaft secured in bearings on the vehicle, an operating lever at the front end thereof, a locking segment for the lever, a crank arm at the rear end of said shaft, a link connecting said crank arm and the movable block on said crank shaft, an arm on said crank shaft and a connection between said arm and the draft animal attached to the vehicle, said crank being curved to enable it to pass around the vehicle axle, said crank also being provided with an end adapted to be engaged between the wheel spokes, said end being provided with a cushioning device to prevent injury to the spoke.

DANIEL W. ARAVE.
CHARLES W. WRIGHT.

Witnesses:
  MORONI SKEEN,
  PHOEBE THOMAS.

Copies of this patent may be obtained for five cents each, by addressing the "Commissioner of Patents, Washington, D. C."